United States Patent [19]

Tyree

[11] Patent Number: 5,639,075
[45] Date of Patent: Jun. 17, 1997

[54] ADJUSTABLE LOCKING RESILIENT MOTORCYCLE ENGINE MOUNT

[76] Inventor: Brian E. Tyree, 4921 Royene NE, Albuquerque, N.M. 87110

[21] Appl. No.: 575,770

[22] Filed: Dec. 20, 1995

[51] Int. Cl.$^6$ .................................................. F16F 1/387
[52] U.S. Cl. ..................... 267/281; 267/140.12; 267/403; 267/31.2; 411/535
[58] Field of Search .................. 267/140.12, 141.2, 267/281; 403/362, 342, 343, 3; 411/535, 536, 546; 384/620

[56] References Cited

U.S. PATENT DOCUMENTS

| | | |
|---|---|---|
| 3,162,457 | 12/1964 | Iacco ........................... 403/342 |
| 3,542,146 | 11/1970 | Hooper ......................... 180/33 |
| 3,616,870 | 11/1971 | Kramer . |
| 3,722,612 | 3/1973 | Issigonis et al. . |
| 3,754,612 | 8/1973 | Watanabe et al. . |
| 3,783,961 | 1/1974 | Hooper ......................... 280/281 |
| 3,811,528 | 5/1974 | Hooper . |
| 4,066,142 | 1/1978 | Hooper . |
| 4,169,512 | 10/1979 | Ishikawa et al. . |
| 4,170,272 | 10/1979 | Smolinski . |
| 4,207,960 | 6/1980 | Hashimoto . |
| 4,323,135 | 4/1982 | Tominaga et al. . |
| 4,324,306 | 4/1982 | Ishihara et al. . |
| 4,373,602 | 2/1983 | Tomita et al. . |
| 4,392,542 | 7/1983 | Aiba . |
| 4,412,597 | 11/1983 | Aiba . |
| 4,421,195 | 12/1983 | Aiba . |
| 4,453,616 | 6/1984 | Porter . |
| 4,465,157 | 8/1984 | Onishi et al. . |
| 4,550,698 | 11/1985 | Konneker . |
| 4,696,364 | 9/1987 | Enoki et al. . |
| 4,753,314 | 6/1988 | Tsukji . |
| 4,781,264 | 11/1988 | Matsuzaki et al. . |
| 4,782,908 | 11/1988 | Trema . |
| 4,809,801 | 3/1989 | Enoki et al. . |
| 5,109,943 | 5/1992 | Crenshaw et al. . |
| 5,340,258 | 8/1994 | Simon ........................... 411/535 |
| 5,390,758 | 2/1995 | Hunter et al. . |
| 5,503,374 | 4/1996 | Hellon ........................... 267/281 |

*Primary Examiner*—Matthew C. Graham
*Attorney, Agent, or Firm*—Laubscher & Laubscher

[57] ABSTRACT

A locking, adjustable, resilient mount for mounting a motorcycle engine on a motorcycle frame includes a shaft rigidly connected with the motorcycle frame via a pair of spaced mounting plates, at least one resilient vibration absorbing member arranged on the shaft, a mounting sleeve connected with the engine which is arranged around the resilient member, a pair of externally threaded collars arranged concentrically around the shaft at opposite ends of the vibration absorbing member, and a pair of internally threaded adjustable thrust plates arranged concentrically around the collars. The thrust plates are rotated on the collars to adjust the resiliency of the mounts and are locked by aligning one of a plurality of radially extending holes contained in the thrust plates with a bore contained in the collars and inserting a locking pin therethrough.

6 Claims, 3 Drawing Sheets

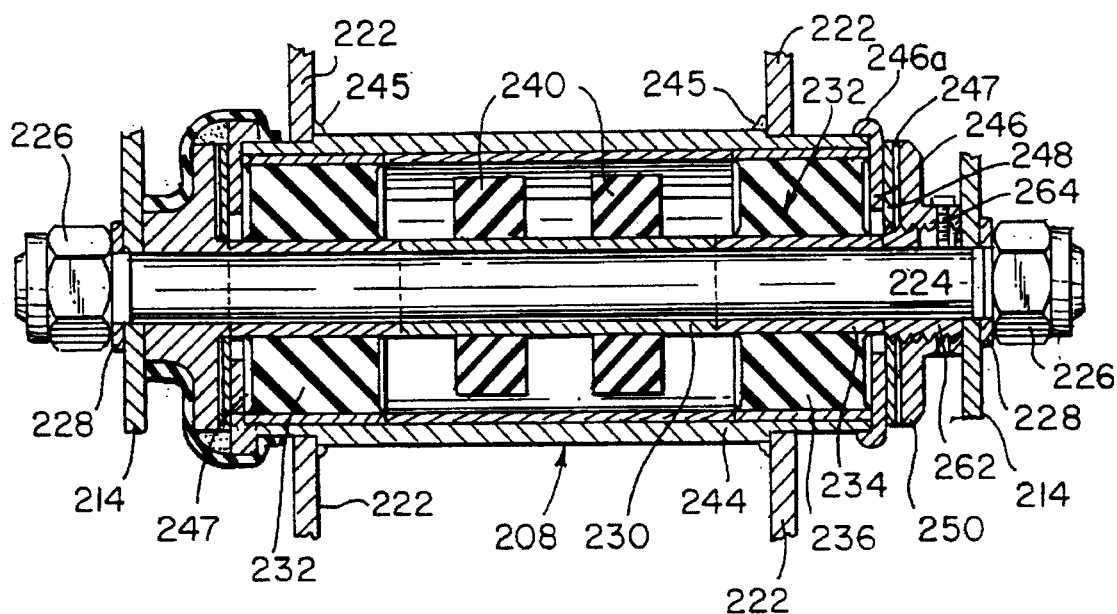
FIG. 4
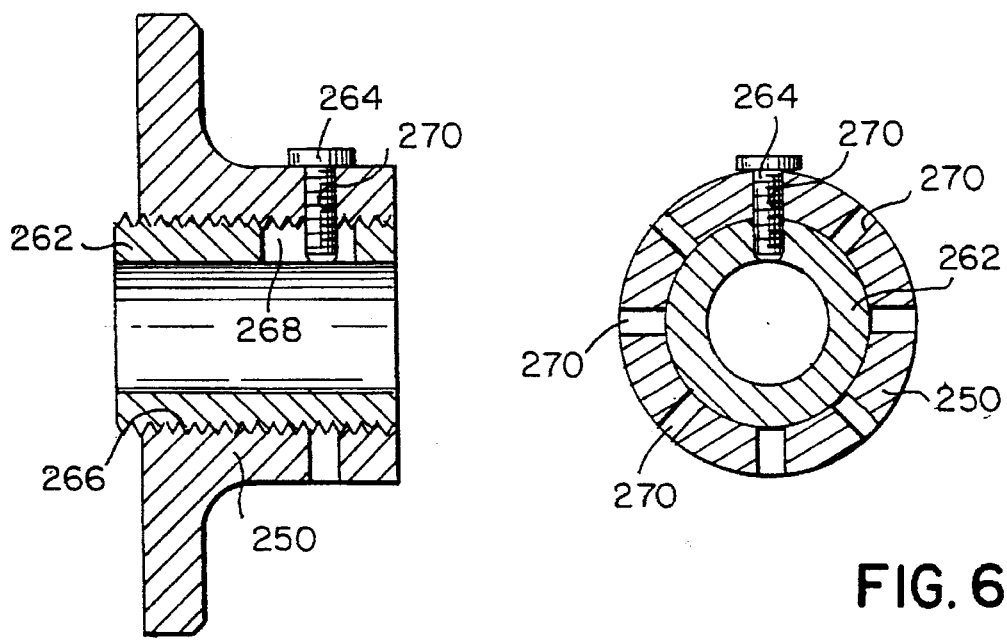
FIG. 5
FIG. 6

ADJUSTABLE LOCKING RESILIENT MOTORCYCLE ENGINE MOUNT

BACKGROUND OF THE INVENTION

Adjustment of vibration dampening mounts on motorcycles is currently a painstaking and time consuming task. The mounts have to be carefully measured with feeler gages, disassembled, and reassembled with shims to the specific clearance. This must be done very precisely. If the shims are too tight, the motorcycle vibrates. If they are too loose, the handling of the motorcycle deteriorates and can become dangerous.

The present invention relates to mounts for mounting engines on motorcycle frames and, more particularly, to a resilient locking mount which can be adjusted in place without causing frame distortion.

BRIEF DESCRIPTION OF THE PRIOR ART

Various devices for mounting an engine on a motorcycle frame are known in the patented prior art. The Crenshaw et al U.S. Pat. No. 5,109,943, for example, discloses an engine stabilizer designed to reduce engine vibrations by distributing the engine vibrations to the motorcycle frame. The stabilizer is mounted between the engine and the frame and includes an internally threaded sleeve adapted to receive an externally threaded adjustment rod which allows the length of the stabilizer to be varied. This device serves only to transfer engine vibrations to the frame and does not include any resilient pads for absorbing vibrations.

The Hashimoto U.S. Pat. No. 4,207,960 discloses a motorcycle having a pair of laterally spaced engine mounting plates for resiliently mounting the engine on the frame. The mounting plates are characterized by flexibility or resiliency in the lateral direction so that the engine vibrations can be absorbed. No resilient members for absorbing vibrations are provided and the mounting plates cannot be adjusted for different loads or engine or frame sizes.

The Aiba U.S. Pat. No. 4,392,542, Watanabe et al U.S. Pat. No. 3,754,612, Hooper et al U.S. Pat. No. 3,542,146, and Hooper U.S. Pat. No. 3,783,961 disclose various devices for resiliently mounting an engine on a motorcycle frame. Adjustment of these devices, however, is often inaccurate, difficult, and time consuming and may cause bending or distortion of the frame.

The present invention was developed to overcome these and other drawbacks of the prior devices by providing an improved resilient mount which can be quickly and accurately adjusted in place without causing bending or distortion of the motorcycle frame. The mount includes a shaft which is rigidly connected with the motorcycle frame via a pair of spaced mounting plates, resilient members arranged on the shaft for absorbing engine vibrations, a mounting sleeve arranged around the resilient members which connects with the engine, and an adjustable locking thrust plate which can be moved to vary the compressive force applied to the resilient members.

SUMMARY OF THE INVENTION

Accordingly, a primary object of the present invention is to provide an improved locking resilient mount which can be adjusted in place without causing frame distortion.

It is a more specific object of the invention to provide an adjustable locking resilient mount having a shaft which rigidly connects with the motorcycle frame, resilient vibration absorbing members arranged on the shaft, a mounting sleeve surrounding the resilient members which connects with the engine, and an adjustable locking thrust plate which engages and applies a compressive force to the resilient members, whereby the resiliency of the mount can be quickly and accurately adjusted.

It is another object of the invention to provide an adjustable locking resilient mount having an externally threaded collar arranged concentrically around the shaft adapted to be received in the locking thrust plate, whereby rotation of the thrust plate varies the compressive force applied to the resilient members.

It is a further object of the present invention to provide an adjustable locking resilient mount having a thrust plate which contains a plurality of radially extending holes and a collar containing at least one bore which can be aligned with the holes, whereby a locking pin can be inserted through the aligned bore and hole to prevent the thrust plate and collar from moving independently.

BRIEF DESCRIPTION OF THE DRAWINGS

Other objects and advantages of the invention will become apparent from a study of the following specification when viewed in light of the accompanying drawings, in which:

FIG. 4 is a sectional view of the mount according to the invention; and

FIGS. 5 and 6 are detailed side and end sectional views, respectively, of the locking adjusting mechanism of the mount.

DETAILED DESCRIPTION

Figure 1:
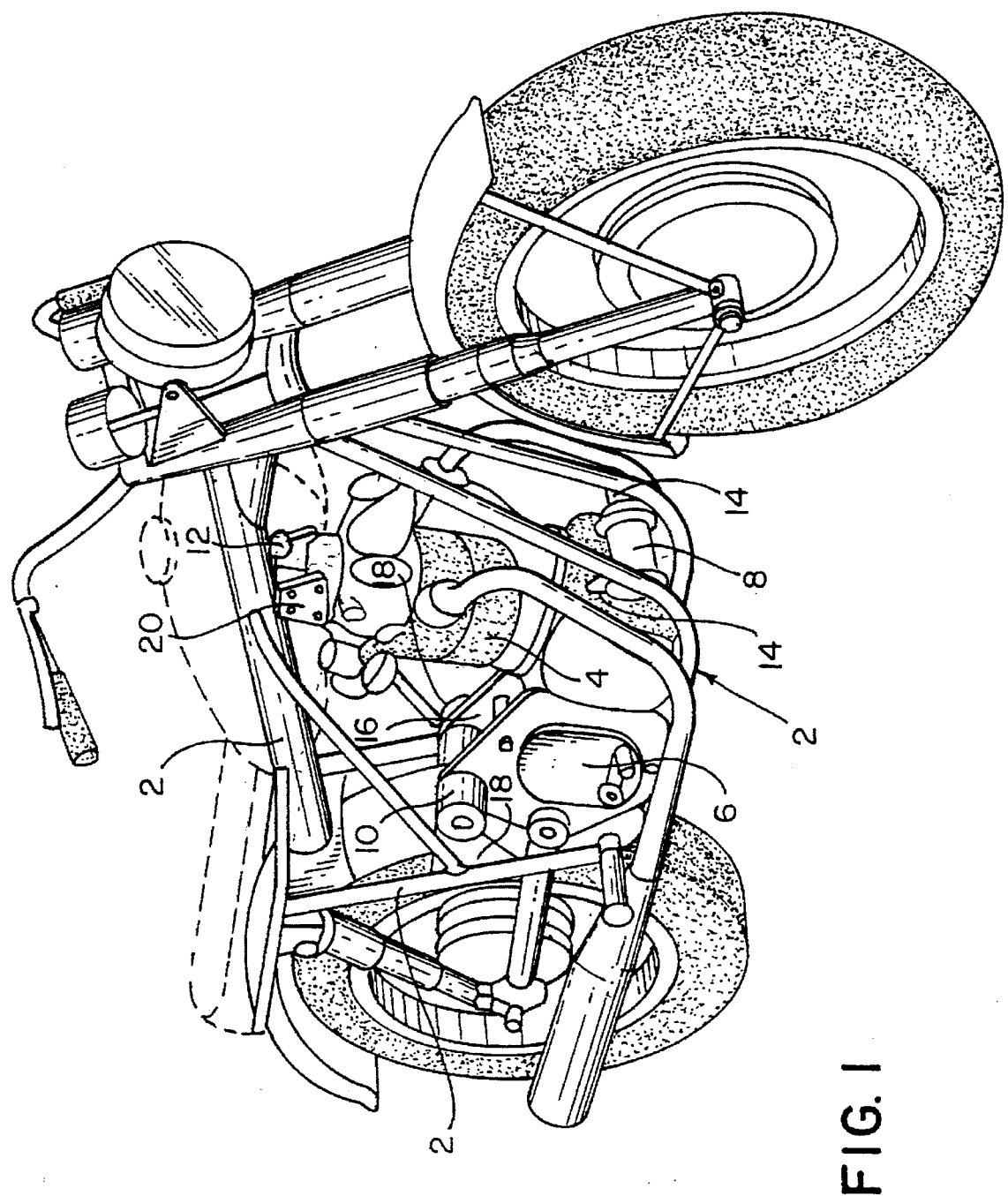
FIG. 1 is a perspective view of a motorcycle having resilient mounts.

Referring first to FIG. 1, there is shown a motorcycle including a frame 2 having an engine 4 and gearbox 6 mounted thereon. In particular, FIG. 1 is intended to represent a Norton Commando motorcycle which was manufactured by Norton Villiers Limited from the late-1960's to the mid-1970's and which is described in the Hooper et al U.S. Pat. No. 3,508,765.

The engine and gearbox are mounted on the frame with three resilient mounts: a forward resilient mount 8, a rear resilient mount 10, and an upper resilient mount 12. The forward resilient mount 8 is used to mount the engine on the frame between a pair of lower front engine mounting plates 14. The gearbox is connected to the engine via a pair of gearbox mounting plates 16. Rear resilient mount 10 receives the gearbox mounting plates 16 and is connected with the frame via rear mounting plates 18, thereby resiliently mounting the gearbox on the frame. The upper resilient mount 12 connects the top of the engine to the frame via a pair of spaced triangular mounting plates 20.

The present invention is directed to the forward and rear mounts and particularly to a modification of the mounts originally manufactured and installed on the Norton Commando motorcycles. The improved mount can be readily adjusted in place without causing frame distortion. In order for the specific improvements to be easily understood and appreciated, the original mounts will be described in detail.

Figure 2:
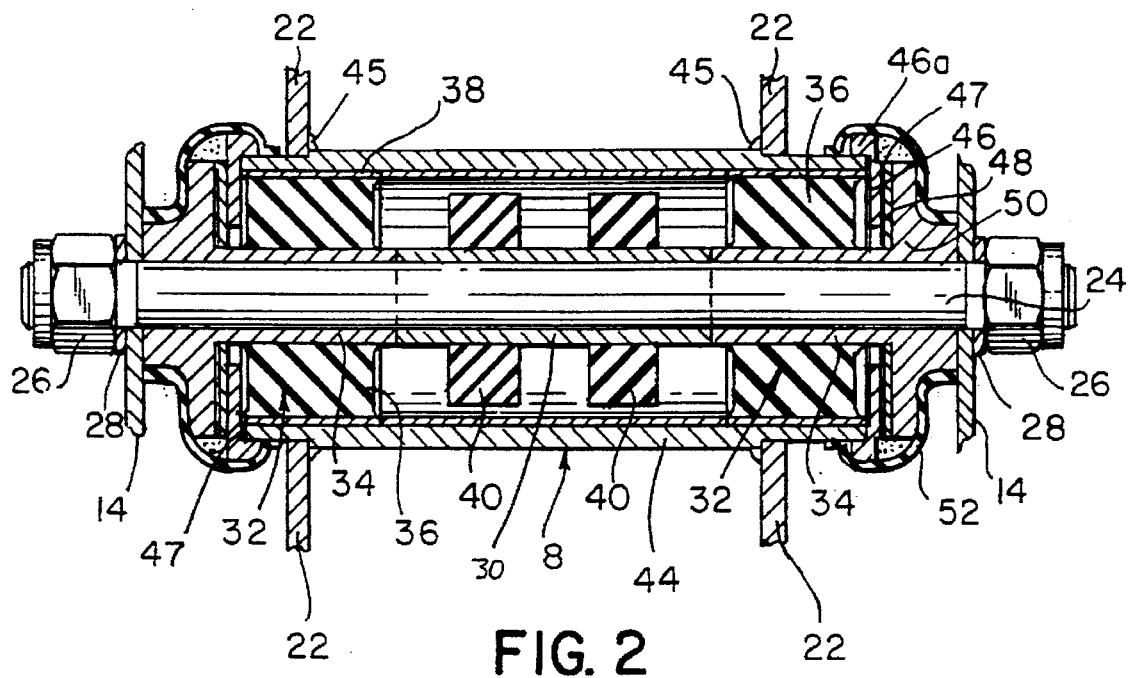
FIG. 2 is a sectional view of a resilient mount according to the prior art.

FIG. 2 shows the forward resilient mount 8 originally installed on the motorcycle described in the Hooper et al U.S. Pat. No. 3,542,146. The mount is arranged between the lower front mounting plates 14 and connected with the engine via mounting plates 22. A shaft 24 extends between mounting plates 14 and is secured thereto with nuts 26 and washers 28. An inner spacer sleeve 30 is concentrically arranged around the center of the shaft and is abutted at each end by a pair of resilient bushes 32 which engage the shaft 24. Each bush includes an inner sleeve 34, an annular resilient member 36, and an outer sleeve 38. Inner spacer sleeve 30 carries a pair of annular resilient members 40 which have a lesser diameter than resilient members 36. An outer spacer sleeve 42 which spaces outer sleeves 38 is arranged around resilient members 40.

A mounting sleeve 44, which is welded to mounting plates 22 at 45, fits around outer spacer sleeve 42 and outer sleeves 38. At each end of mounting sleeve 44 there is an inner thrust plate 46 having a flange portion 46a which overlaps the ends of mounting sleeve Shims 47 are arranged between each end of mounting sleeve 44 and the adjacent inner thrust plate 46 and are adjusted so that the end float of the shaft 24 relative to the mounting sleeve 44 is between 0.005 and 0.01 inches.

Adjacent inner thrust plates 46 are washers 48 and adjacent the washers are a pair of outer thrust plates 50. A gaiter 52 formed of flexible material is arranged at each end of the mount and at one end engages flange portion 46a of the inner thrust plate and at the other end engages mounting plates 14.

Since rear resilient mount 10 is similar to forward resilient mount 8 except that it has different dimensions, it is not described in detail.

Figure 3:
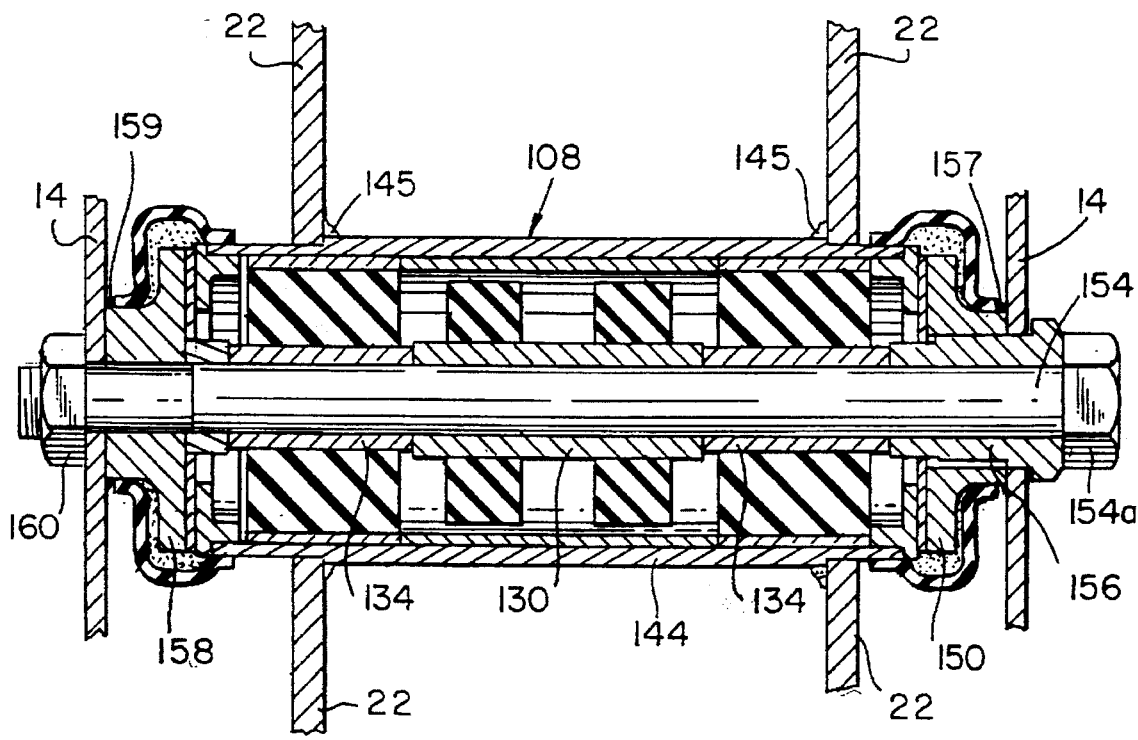
FIG. 3 is a sectional view of an adjustable prior art resilient mount.

FIG. 3 shows an alternate resilient mount 108 which is also described in the Hooper et al U.S. Pat. No. 3,542,146. This mount eliminates the use of shims in the adjustment procedure described above. The mount can be used in place of either forward mount 8 or rear mount 10 but will be described in relation to forward mount 8.

Mount 108 is similar to the mount shown in FIG. 2 except that the shaft 24 is replaced with a bolt 154 which carries on its head end 154a an adjusting sleeve 156. The adjusting sleeve serves the dual purpose of holding sleeves 130 and 134 in place and transmitting the compressive force to mounting plate 14 which, in turn, delivers the compressive force to outer thrust plate 150. Adjusting sleeve 156 is received in outer thrust plate 150 which is welded to a corresponding mounting plate 14 at 157. It will be recognized that welds similar to welds 157 are not required for the installation of the mount shown in FIG. 2. Rather, for the mount shown in FIG. 2, outer thrust plates 50 simply abut mounting plates 14, thereby allowing the proper shims to be installed during the adjustment procedure. Welds 157 make mount 108 difficult to install, remove, or service, and make it extremely difficult to remove the engine-transmission unit for any reason.

The other end of the bolt 154 is threadably received in the other outer thrust plate 158 which is welded to the other mounting plate 14 at 159 and carries a lock nut 160. The end float may therefore be adjusted with the bolt 154 and adjusting sleeve 156 without using shims. The primary drawback of this mount is that since the compressive force is applied to the outer thrust plate 150 via mounting plate 14, it would cause the frame to bend as bolt 154 is tightened. This makes the bolt difficult to tighten and places an additional stress on the frame. In addition, the mount in FIG. 2 cannot be easily modified to produce the mount shown in FIG. 3.

Referring now to FIGS. 4-6, there is shown a resilient mount 208 that is the same as the one shown in FIG. 2 except that the outer thrust plate 250 has been modified to receive a collar 262 and a locking pin 264. Accordingly, outer thrust plate 250 contains an internally threaded bore 266 adapted to receive the externally threaded collar 262 which is arranged concentrically around shaft 224. Collar 262 contains a through bore 268 which is aligned with one of a plurality of radially extending holes 270 (FIG. 6) contained in thrust plate 250 to receive locking pin 264. In this manner, the mount can be adjusted and locked at a discrete precise location. Alternatively, an Allen screw, rivet or the like could be used to lock thrust plate 250 in place.

It can be seen that collar 262 is slightly longer than thrust plate 250, whereby collar 262 abuts inner sleeve 234 and mounting plate 214 at each end. Thus, when nuts 226 are tightened, collar 262 is clamped between inner sleeve 234 and mounting plate 214. This locks collar 262 in place and prevents it from rotating or moving axially along the shaft 224. The extra length also allows the position of thrust plate 250 to be varied without causing collar 262 to become unclamped. In addition, since adjustment is accomplished via thrust plate 250 which is arranged between mounting plates 214, adjustment does not place any stress on the mounting plates and will not produce any frame distortion.

To properly adjust a mount which has been installed on mounting plates 214, thrust plate 250 is tightened until engine vibration is sensed by the operator. The thrust plate is then backed-off (i.e. loosened) until the vibration is eliminated. When the vibration is eliminated, the mount is perfectly adjusted. Once adjusted, locking pin 264 is inserted into the hole 270 aligned with bore 268. The resiliency of the mount is now set and locked.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. An adjustable, locking, vibration dampening mount adapted for placement between a pair of generally parallel mounting plates connected with a frame for attenuating vibrations transmitted from an engine to the frame, comprising (a) an elongated shaft secured at each end to one of the mounting plates;

(b) vibration dampening means arranged on said shaft for absorbing vibrations transmitted from the engine to the frame;

(c) a mounting sleeve connected with the engine and surrounding said dampening means;

(d) a pair of inner thrust plates arranged adjacent said mounting sleeve and said vibration dampening means;

(e) a pair of washers adjacent said inner thrust plates;

(f) a pair of outer thrust plates arranged between said washers and the mounting plates, at least one of said outer thrust plates containing a threaded internal bore and further containing a plurality of radially extending holes; and (g) at least one externally threaded collar arranged concentrically within said threaded outer thrust plate adjacent said shaft, said collar containing at least one bore arranged to allow said bore to be aligned with at least one of said holes contained in said outer thrust plates.

2. Apparatus as defined in claim 1, wherein said aligned hole and bore are adapted to receive locking means therein, whereby said at least one outer thrust plate and said collar are prevented from rotating independently.

3. Apparatus as defined in claim 2, wherein said locking means comprises a screw.

4. Apparatus as defined in claim 1, wherein said vibration dampening means includes at least one resilient member arranged around said shaft between said locking thrust plate means.

5. Apparatus as defined in claim 4 wherein said vibration dampening means includes (a) a pair of resilient bush assemblies arranged concentrically around said shaft adjacent said inner thrust plates;

(b) an annular spacer sleeve arranged concentrically around said shaft between said bush assemblies; and (c) at least one resilient inner annular vibration absorbing member rigidly secured concentrically around said spacer sleeve.

6. Apparatus as defined in claim 5, wherein each of said bush assemblies includes (1) a pair of annular inner sleeves arranged concentrically around said shaft adjacent said spacer sleeve;

(2) a pair of outer resilient annular vibration absorbing members arranged concentrically around said inner sleeves; and (3) a pair of annular outer sleeves arranged concentrically around said outer vibration absorbing members.

* * * * *